United States Patent
Heisler

[11] 3,877,135
[45] Apr. 15, 1975

[54] METHOD AND APPARATUS FOR APPLYING PLASTIC GRIPS TO WIRE BAIL HANDLES

[76] Inventor: Raymond A. Heisler, 657 Dakota Trail, Franklin Lakes Township, Bergen County, N.J. 07417

[22] Filed: Sept. 25, 1974

[21] Appl. No.: 509,002

[52] U.S. Cl............... 29/429; 29/208 B; 29/208 C; 29/234; 29/428; 29/439; 140/75; 140/93 B
[51] Int. Cl.............................................. B23p 19/00
[58] Field of Search ............ 29/417, 429, 439, 428, 29/234, 208 C, 208 B, 241, 433; 140/93 B, 75

[56] References Cited
UNITED STATES PATENTS

| | | | |
|---|---|---|---|
| 865,001 | 9/1907 | Thompson | 140/75 |
| 891,734 | 6/1908 | Reynolds et al. | 140/75 |
| 1,070,696 | 8/1913 | Kempster | 140/75 |
| 2,823,153 | 2/1958 | Bunnell et al. | 29/234 X |
| 3,444,905 | 5/1969 | Heisler | 29/428 X |
| 3,530,565 | 9/1970 | Lanza et al. | 29/429 X |
| 3,675,305 | 7/1972 | Heisler | 29/439 |

*Primary Examiner*—Richard J. Herbst
*Assistant Examiner*—Victor A. Di Palma
*Attorney, Agent, or Firm*—Ralph R. Roberts

[57] ABSTRACT

This disclosure pertains to an improved method and apparatus for applying plastic grips to wire bail handles. This improved method and apparatus is used in combination with a wire bail-forming mechanism which feeds, cuts and forms wire into a wire bail and automatically attaches this bail to an eared container. In particular, a pneumatic tubing advance means and an improved tubing advance means is disclosed. This improved method and apparatus is employed with much of the mechanism shown in my U.S. Pat. No. 3,675,305 as issued on July 11, 1972.

16 Claims, 6 Drawing Figures

Fig_5

Fig. 6

METHOD AND APPARATUS FOR APPLYING PLASTIC GRIPS TO WIRE BAIL HANDLES

CROSS-REFERENCE TO RELATED PATENTS

This application incorporates the basic concept of bail making and uses the wire advancing, cutting and bending as shown in my U.S. Pat. No. 3,241,578 as issued on Mar. 22, 1966. A plastic grip applied to such a wire bail is shown in my U.S. Pat. No. 3,444,905 as issued on May 20, 1969. An improved plastic grip applying method and apparatus is shown in my U.S. Pat. No. 3,675,305 issued on July 11, 1972. To the extent applicable the subject matter of these patents is incorporated by reference into the present application.

BACKGROUND OF THE INVENTION

1. Field of the Invention

With reference to the classification of art as established in the United States Patent Office this invention pertains to the general Class of "Metal Working" (Class 29) and more particularly to the subclass of mechanical manufacture pertaining to "by deforming interlock — by wrapping around" (subclass 439).

2. Description of the Prior Art

U-shaped wire bails are well known in the art and an automatic mounting of such wire bails to eared containers by high speed apparatus in which the wire is formed and applied to an eared container at one station is fully disclosed in my U.S. Pat. No. 3,241,578 as issued on Mar. 22, 1966.

The present invention, to be hereinafter described, relates to the providing of a handgrip of plastic tubing mounted on the midportion of a wire bail as formed and mounted by this mechanism. In bails formed and applied by this automatic high speed apparatus, the bails are characterized in that they are from a single length of wire which is of conventionally about ninety- to one hundred and twenty-five-thousandths of an inch in diameter. This bail is attached to an eared container often containing paint or other material of heavy consistency. Such a heavy container becomes difficult or painful to carry when the bail is of such relatively thin plain wire. It is well known to provide a wire bail handle for a container of more than one-gallon capacity, which container prior to the mounting of the bail to the container, or at the time of sale, is provided with a grip support or handle to the bail midportion. Often this grip support is in the form of a U-shape snap-on member. It is also known to provide a plastic or wooden handgrip which is mounted on and is intended to rotate on the mid-portion of a formed wire bail. An apparatus and method for providing an inexpensive tubular plastic handgrip on a wire bail mounted on containers as small as one-gallon is shown in the present invention.

A method of applying a plastic tube grip portion to a wire bail handle for small and large containers is shown in my above identified U.S. Pat. No. 3,444,905 issued May 20, 1969. In this patent is shown a method and apparatus for providing a wire bail with a midportion of partially resilient plastic tubing providing a grip of sufficient length to allow grasping in the hand of the user and of sufficient resilience to cushion the impact of the weight of the container and contents on the fingers of the one carrying the container. The resulting grip portion is comfortable to grasp and permits the use of a wire bail which is smaller in diameter and higher in tensional strength than the conventional bare wire bail attached to an eared container.

Insofar as is known, bail-forming and applying mechanism as disclosed in U.S. Pat. No. 3,241,578 has not been combined with apparatus for automatically providing a cushioning handgrip except as shown in my U.S. Pat. No. 3,444,905, above-identified, and also in my U.S. Pat. No. 3,675,305 as issued on July 11, 1972. In both of these patents a preferred embodiment and alternate embodiments of the tubing cut off and transfer is shown by which the cut tubing is brought in alignment of the advancing wire bail prior to its being formed. However efficient these systems are, it has been found desirable to increase the speed of operation of the wire bail-forming and applying mechanism and in concert therewith a tubing transport, cut off and transfer of the plastic tubing. This new and novel apparatus permits the use of a plastic tubing of foam construction having a very resilient gripping surface. The present invention improves the technique of transporting and cutting off of the tubing and is directed toward achieving this result at a higher speed.

SUMMARY OF THE INVENTION

The apparatus of this invention is adapted for use with automatic bail-forming and applying mechanism such as is provided by my above-identified U.S. Pat. No. 3,241,578 which to the extent applicable is incorporated herein. In combination with this bail-forming mechanism there is provided advancing mechanism for feeding a determined length of foam plastic tubing. This plastic tubing feeding mechanism includes a pair of one-way grip clamps in which one clamp pair is a check means disposed in a fixed relationship to a tubing guidetrack and is arranged to permit the ready advance of tubing to and into a cut off and transfer mechanism. The other clamp pair is carried by a cycling mechanism which in the present instance provides a determined linear stroke or movement of the clamp pair by which the tubing is gripped for advancement toward and to a transfer and cut off mechanism. On the return stroke the cycled clamp pair is moved to slide over the tubing and toward the fixedly located check clamp pair.

The present invention particularly incorporates a new and novel method of receiving the advanced tubing, cutting the tubing at the termination of the advancing cycle and then transferring this cut length of tube to and into a position whereat the tubing bore is aligned with the advancing wire and between the upper and lower dies for forming the wire bail. In this transfer mechanism is incorporated a holding means for the cut off knife which cuts the tubing precisely to length near the termination of the return stroke of the transfer mechanism. Insofar as applicable the apparatus of tubing advance as seen in my above-identified U.S. Pat. No. 3,675,305 in combination with the wire bail forming mechanism is incorporated by reference into this application.

In the preferred embodiment of the present invention there is shown a tubing cutting arrangement wherein a razor blade is disposed to precisely cut an advanced portion of the tubing to provide a desired length of cut tubing. This cutting of the tubing occurs upon the return stroke of a transfer arm which has upper and lower fingers which grip the cut tubing to retain the tubing at the distal end of said fingers as the transfer arm moves forward to bring this gripped cut piece of tubing in way of an advancing wire which is brought between the bail-forming dies.

It is an object of this invention to provide in combination with a wire bail-forming and applying apparatus a bail having a plastic tubing handgrip disposed intermediate its ends. This handgrip portion is mounted at the midportion of the bail and is supplied to a cut off and transfer mechanism which is pneumatically actuated. The tubing advance is by a tubing advancing mechanism having two pairs of jaw clamps.

It is a further object of this invention to provide in combination with said wire bail-forming apparatus a tubing receiving and transfer arm having long extending transfer fingers resiliently biased toward each other and having arcuate ends into which the cut length of plastic tubing is received as and after it has been transferred forward by and between the fingers of the tubing advancing mechanism. In an open guideway path a support block guides the tubing in its desired path between said flexible fingers and when the cut off knife, which is carried by the transfer arm, is moved rearwardly by and with the transfer arm it cuts the tubing which is supported by the guide block during the movement of the knife.

In addition to the above summary the following disclosure is detailed to insure adequacy and aid in understanding this invention. This disclosure, however, is not intended to prejudice that purpose of a patent which is to cover the new inventive concept no matter how it may later be disguised by variations in form or additions of further improvements.

For this reason a specific embodiment has been chosen for the purpose of illustration and description as shown in the accompanying drawings wherein:

In the following description and in the claims various details are identified by specific names for convenience. These names, however, are intended to be generic in their application. Corresponding reference characters refer to like members throughout the several figures of the drawings.

The drawings accompanying and forming part of this specification disclose certain details of construction for the purpose of explanation of the broader aspects of the invention but it should be understood that structural details may be modified in various respects without departure from the concept or principles of the invention.

Figures 1, 2:
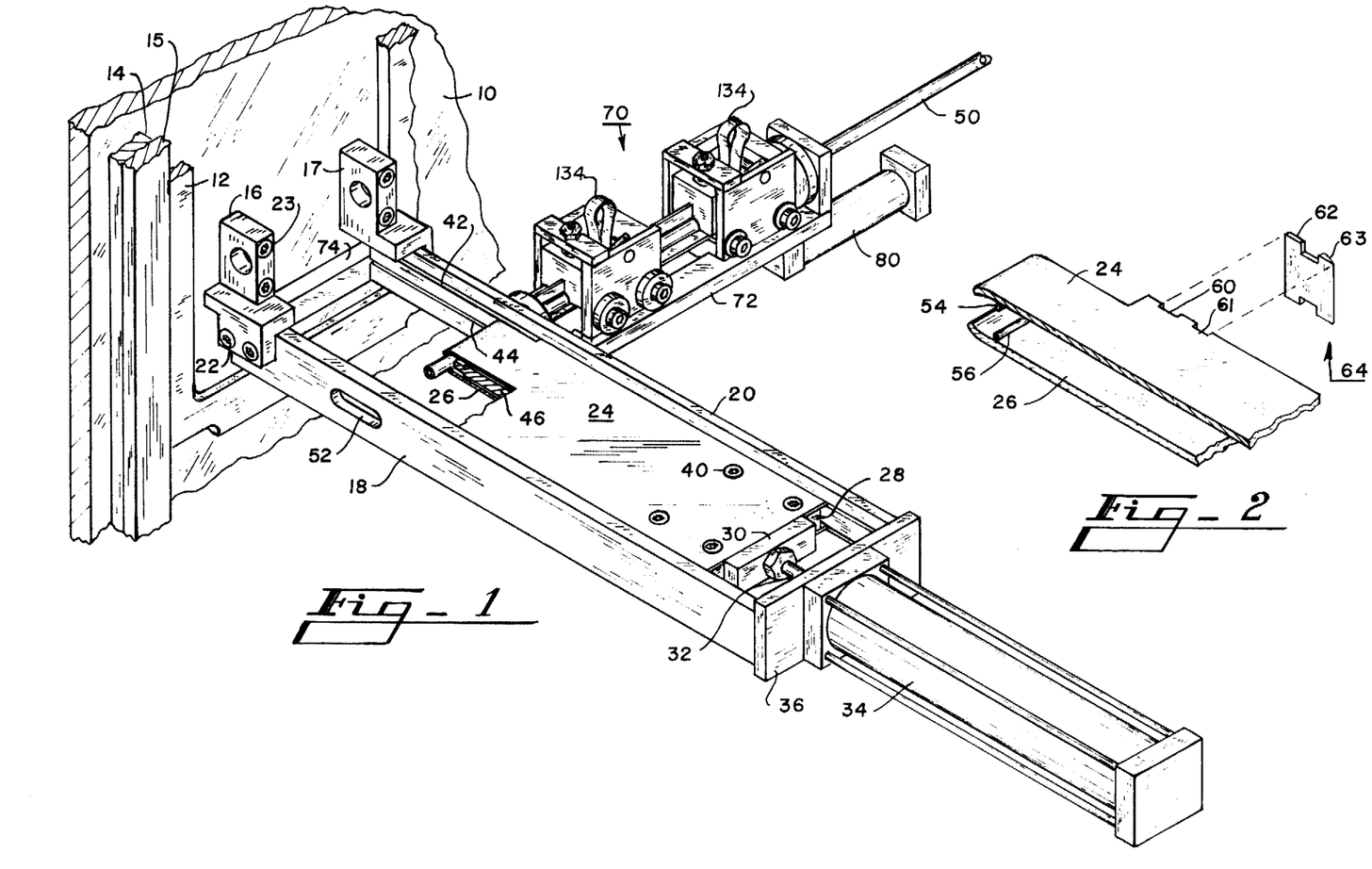
FIG. 1 represents an isometric view showing in particular the tubing advancing mechanism by which the advanced plastic tube is fed between the finger members of a pneumatically actuated transport mechanism and is cut by a knife carried by this transport mechanism.
FIG. 2 represents in an enlarged scale a fragmentary isometric view of the forward portion of the upper and lower tube transport fingers and the attaching means for a tube cutting knife or blade which is carried therewith.

Description of the Tubing Cut Off and Transferring Mechanism As Used With An Automatic Bail-Forming and Attaching Mechanism Referring now to the tubing cut off and transferring mechanism as shown in FIGS. 1 through 4, there is depicted in FIG. 1 the assembled transport mechanism enabling comparisons to be made with the construction of the tubing transport shown in FIG. 2 of my above-identified U.S. Pat. No. 3,675,305. As depicted in FIG. 1, a main plate 10 of the bail applying apparatus carries a movable plate 12 by means of guides 14 and 15 partially depicted on the left side of this view. Of course, retaining guides are provided for the other or opposite edge of the movable plate but are not depicted in this drawing. Right-and left-hand support blocks 16 and 17 have their lower portions formed to provide right angle guideways which are adapted to receive and retain near and far side rails 18 and 20. These rails are retained by means of cap screws 22 which pass through holes in the blocks 16 and 17 and enter into threaded holes formed in the side rails 18 and 20. The cap screws 22 are tightened to secure these side rails to the blocks 16 and 17. Cap screws 23 pass through holes in block 16 and 17 and enter threaded holes in plate 10 to secure the blocks 16 and 17 to the main plate.

Upper and lower finger members 24 and 26 are made of spring steel and at their rear end are mounted a spacer block 28. This block is attached to a header block 30 having a threaded hole which receives the threaded end of a piston rod or shaft 32 of a pneumatic cylinder 34. The gland end of cylinder 34 is secured to an end block 36, which block also spaces and retains the outer ends of side rails 18 and 20. Screws 40 retain the upper and lower finger members 24 and 26 to the spacer block 28. Formed in the inner surface of each of the side rails 18 and 20 are upper and lower guideways 42 and 44. These parallel grooves are of a determined depth and are disposed to slidably receive and retain the extending side portions of the upper and lower finger members 24 and 26.

Figure 3:
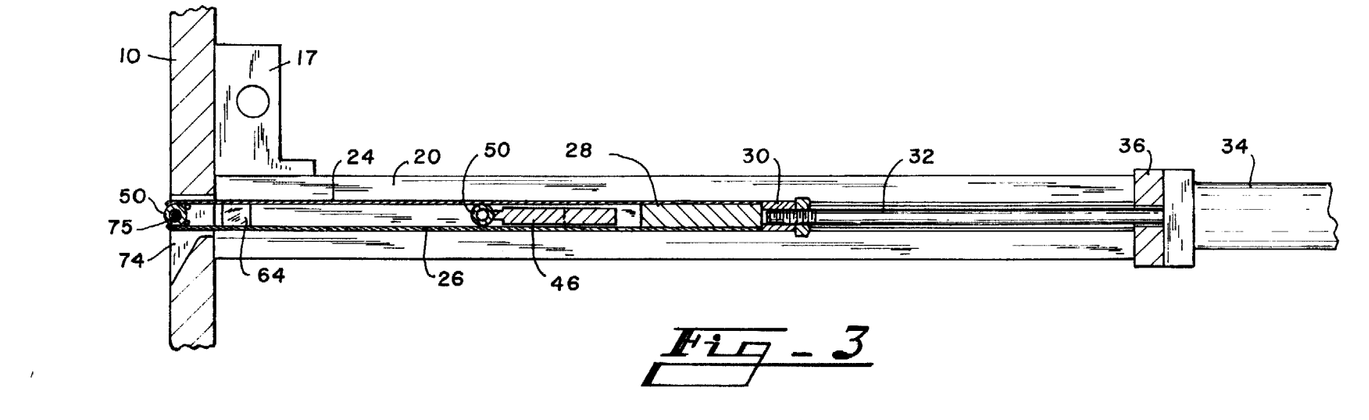
FIG. 3 represents a diagrammatic side view, partly in section, of the tubing transfer apparatus of FIG. 1 and depicting the transfer fingers as moved by the attached pneumatic plunger to the forward transfer condition and showing the advancing tubing being fed into and between the fingers while the forward end of the fingers position the cut tube in way of the advancing wire.
Figure 4:
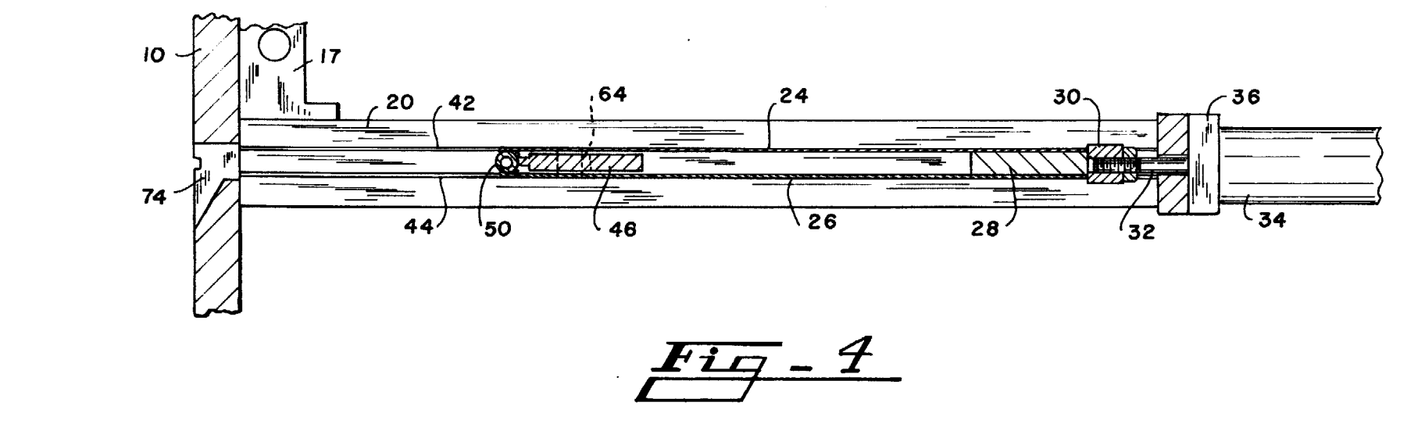
FIG. 4 represents a diagrammatic side view of the transfer mechanism of FIG. 3 in its retracted position and after the knife has cut off the tube the distal ends of the finger portions gripping the cut tube just prior to the forward transport.

The forward ends of finger members 24 and 26 are made slightly narrower than the distance between side rails 18 and 20. This permits a desired spring action of and at the forward end of the finger members to occur when the cut tubing is to be withdrawn. The extending side portions of members 24 and 26 are carried in and slide in the groove guideways 42 and 44 which establish the determined plane of thhe reciprocation of the finger members. Extending between the two side rails 18 and 20, and secured thereto, is a tubing support member 46 which has its forward end reduced and contoured. The left edge of support member 46, as seen in FIGS. 3 and 4, is arcuately concave so as to engage and support a portion of the curved surface of a plastic tube 50. In the side of the near side rail 18 is formed a cutout 52 through which the tube 50 may be withdrawn if required.

As seen in detail in FIG. 2, the forward end of upper member 24 is curved slightly downwardly and there is secured to its undersurface a tubing stop shoulder or rib 54. The lower finger 26 is curved upwardly slightly in a manner and extent much like finger 24 and secured to and carried on its upper surface is a tubing stop shoulder or rib 56. The forwardly curved portion of fingers 24 and 26 and the associated tubing stop ribs 54 and 56 provide a guideway in which the advancing tube 50 is retained. On the far side of finger members 24 and 26, as seen in FIG. 2, the extending side portions thereof are formed with like notches 60 and 61. These notches are formed to receive and retain like-sized extending tab portions 62 and 63 on a cutting blade 64 which is preferably a very thin member. As reduced to practice, this blade is a high grade steel razor blade having a very sharp cutting edge. This sharp edge, as seen in FIG. 2, is carried adjacent side rail 20 and is directed rearwardly.

Figure 6:
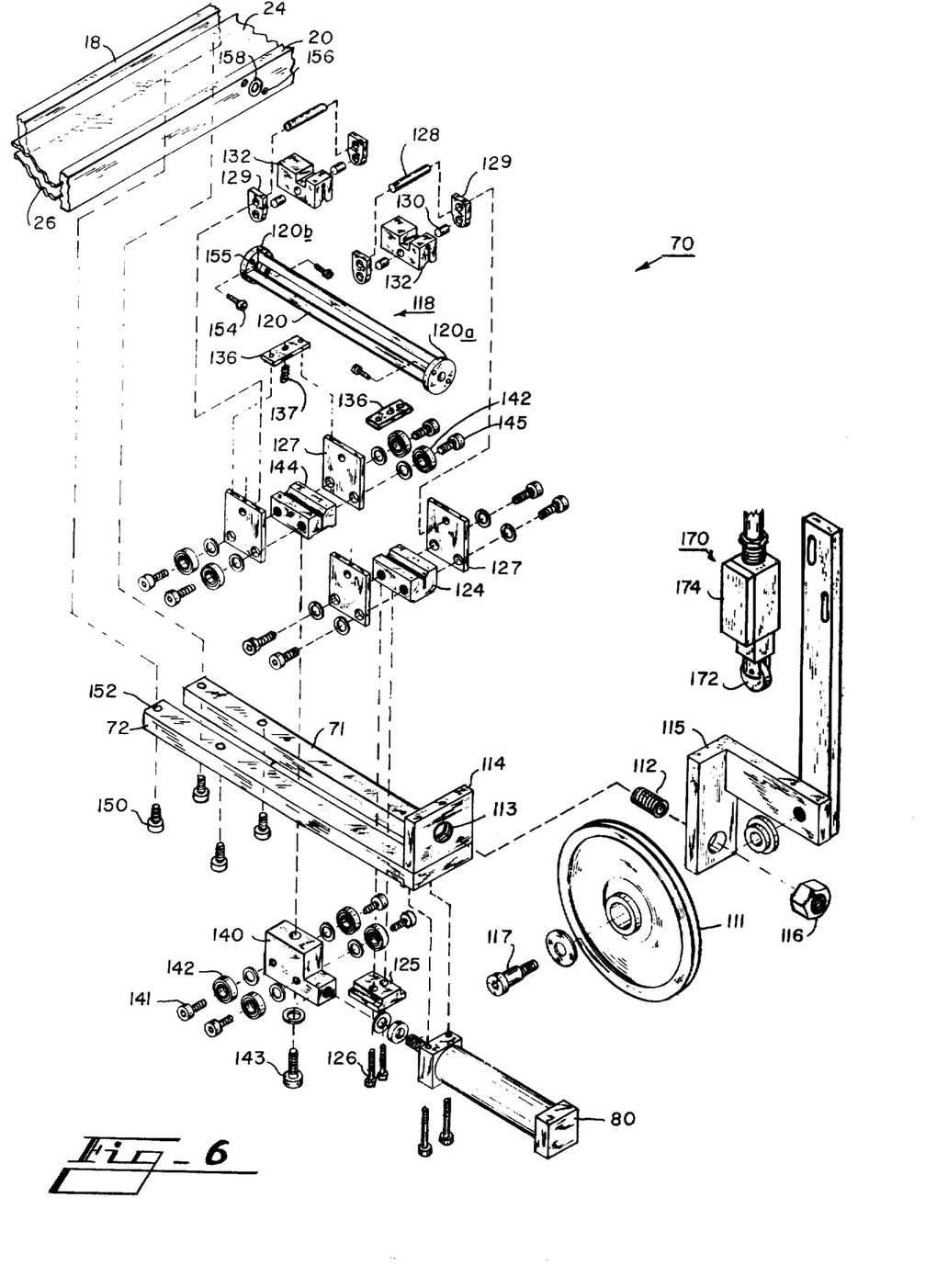
FIG. 6 represents an exploded isometric view showing the components and their arrangement as used in the tubing advancing mechanism with the means for attaching to the transport mechanism.

As seen in FIG. 1, there is shown an assembled tubing advance or transport mechanism similar to or identical to that described in my U.S. Pat. NO. 3,675,305. This mechanism is generally identified as 70. Guide and support members 71 and 72, as particularly seen in FIG. 6, are attached to the undersurface of side rails 18 and 20 of this tubing transport mechanism. Also seen in FIG. 1 is a cutout slot 74 formed in plate 10. This slot is depicted in FIG. 4 and is adapted to permit the spring ends of the fingers 24 and 26, with the cut tubing therebetween, to enter thereinto and in way of an advancing wire 75, as shown in FIG. 3. This wire is advanced and after passing through the cut tube is bent into a bail and mounted in the ears of a container as fully described in the prior identified patents.

Figure 5:
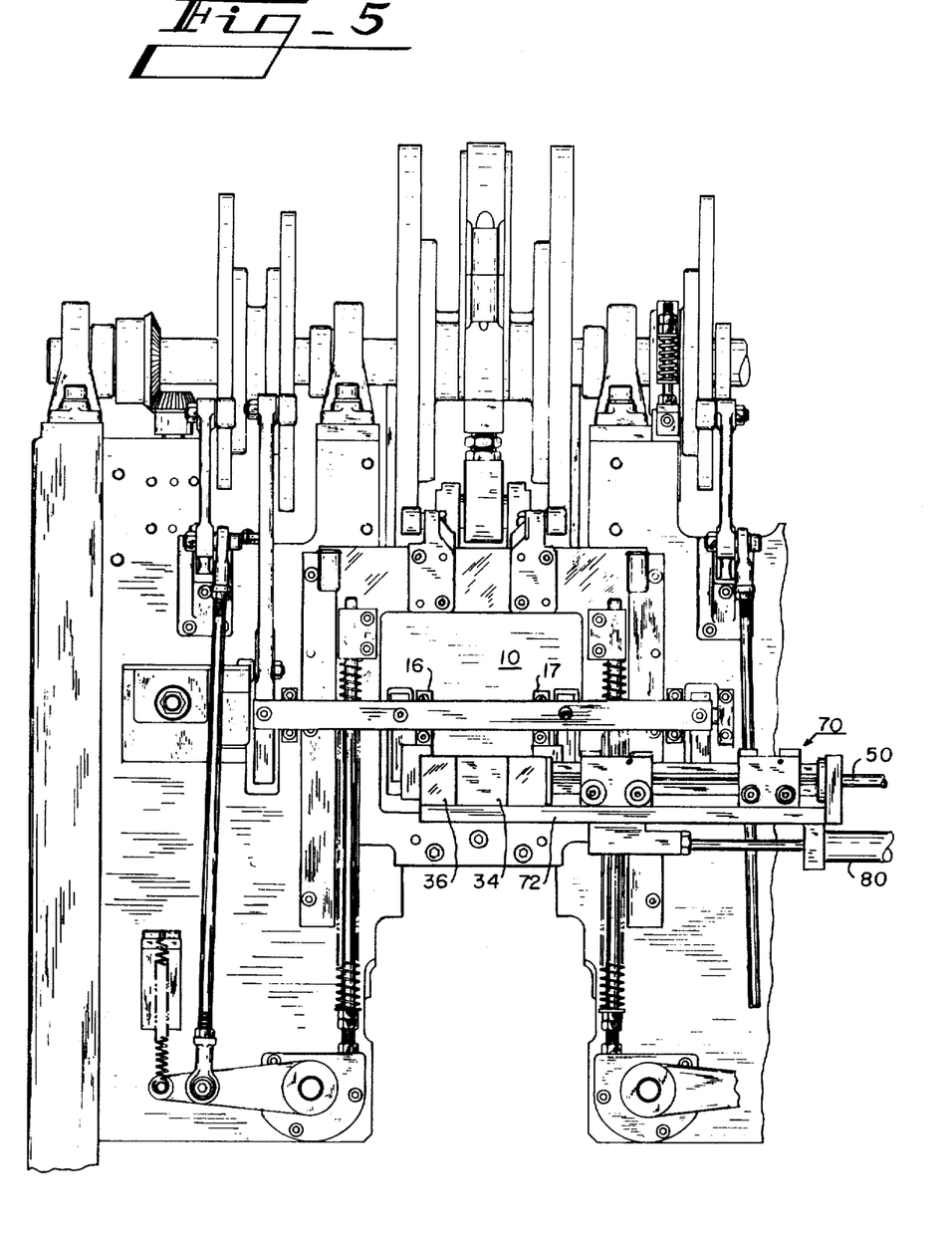
FIG. 5 represents a rear view of the bail-forming apparatus with the tubing transport mechanism mounted in the position it occupies on this bail-forming apparatus.

Mounting of the Cutoff Apparatus to the Bail-forming Apparatus as Seen in FIG. 5

Referring next to FIG. 5, the pneumatic cylinder 34 is depicted as carried on the end member 36. The blocks 16 and 17 are seen attached to the main plate 10. The advancing tube 50 and the tubing transport mechanism 70 is fully described in the prior identified patents. The relationship and the positioning of the tubing cutoff and transfer apparatus on the bail applying apparatus are shown as is a pneumatic cylinder 80 which moves the tubing transport mechanism generally identified as 70. The exact length of the tubing advance is established by the length of the adjusted stroke of cylinder 80, to be described in conjunction with FIG. 6 hereinbelow.

Tubing Transport Apparatus of FIG. 6

Referring next to a preferred embodiment of a tubing transport mechanism 70, as seen in FIG. 6, there is shown apparatus where from a supply reel there is supplied a length of plastic tubing 50 which, as it is advanced, is carried over a grooved pulley 111 and to and through a guide bushing 112 mounted in a threaded hole 113 formed in a slide block guide and front support 114. Pulley support bracket 115 is mounted on bushing 112 and is retained in position by means of a nut 116. A cap screw 117 acts as a shaft for pulley 111 and is carried in a threaded hole in bracket 115. A tubing guide generally identified as 118 in the exemplified form includes four guide rails 120 retained by end plates 120a and 120b. The end plates 120a and 120b have centrally positioned bores sized to act as guides for the tubing 50. The four guide rails are spaced so that their inner edges collectively act as the guide for this tubing 50.

Support 114 is mounted on bottom rails 71 and 72 upon which is mounted a front fixed block 124. This block is clamped to the rails by means of guide clamp 125 and screws 126. Clamp 125 may be loosened to permit adjustment of block 124 along the rails. A hinge plate 127 is mounted on each side of the front fixed block 124 and carries a pin 128 upon which is pivotally mounted a pair of links 129. The lower portion of each of these links is provided with a hole sized to snugly receive and retain a pivot pin 130. A cap member 132 has holes disposed in its side, which holes pivotally receive the pivot pins 130.

As depicted, the front fixed block 124 has its upwardly facing surface grooved to receive one of the guide rails 120 and adjacent this groove the block is chamfered to provide a guide surface for the plastic tubing. In like manner the cap member 132 has its downwardly facing surface grooved to receive one of the guide rails 120, and adjacent this groove the cap member is chamfered to provide a mating guide surface for the plastic tubing. Shown in FIG. 1 is a flat spring 134 having one end engaged by a set screw (not shown) carried in one upwardly extending portion of the cap member and the other end of the spring is engaged by pin 128. Left of the pin is a bridge block 136 which is attached to the hinge plates 127. Between block 136 and cap member 132 is mounted a compression spring 137.

Still referring to FIG. 6, the movable plastic gripping mechanism is cycled by air cylinder 80 which is mounted to the rails 71 and 72. To the end of the piston rod of cylinder 80 is attached a slide block 140 which has transversely drilled and threaded holes formed therein to receive cap screws 141. These cap screws retain and position ball bearing rollers 142. As shown, there are four such rollers mounted to the slide block and these rollers are arranged in pairs and are disposed to engage the underside of bottom rails 121 and 122. A vertically disposed hole in the upstanding portion of block 140 provides a passageway for bolt 143 which engages a threaded hole in the underside of pusher block 144. The upper portion of block 140 is sized to slide between rails 71 and 72 which provide a guide control for the reciprocation stroke of the tubing pusher arrangement. Pusher block 144 is configured like block 124 but instead of being fixed as block 124 is reciprocably moved by cylinder 80.

The construction of the upper portion of the tube pusher assembly is substantially identical to the fixed tube gripping mechanism in that a cap member 132 is carried between a pair of hinge plates 127 and is supported therebetween by links 129. What is different is that to the outside of the hinge plates there is mounted by means of cap screws 145 four ball bearing rollers 142. These rollers are disposed directly above the lower-like rollers and this grouping of rollers is spaced so as to engage the rails 71 and 72 in a smoothly rolling manner.

The tubing transport mechanism 70 is secured to side rails 18 and 20 of the cut off and transfer mechanism.

Cap screws 150 pass through holes 152 in bottom rails 121 and 122 and into threaded holes in side rails 18 and 20. End plate 120b, which carries the four guide rails 120, is secured to side rail 20 by cap screws 154 passing through holes 155 and into threaded holes 156 in side rail 20. The tubing guide hole formed in end plate 120b is coaxial with a guide bushing 158 mounted in side rail 20.

Operation of the Tubing Feeding Mechanism of FIG. 6

Tubing 50 is fed from a storage reel (not shown) to and over grooved pulley 111 and through bushing 112, end plate 120a and between front fixed block 124 and its cooperating cap member 132. The tubing is continued between the guide rails 120 to and through a guide hole in end plate 120b, thence through bushing 158. Pusher block 144 and its cooperating above-disposed cap member 132 are reciprocated by means of cylinder 80 and the movement of the attached slide block 140. The feeding of a determined length of tubing is accomplished by the movement of this pusher assembly with the slide block 140 to its rightward extreme determined position near or next to the fixed grip assembly. The cylinder 80 is actuated to move the rod outwardly and the attached block 140 leftwardly toward side rail 20. The pivotally supported cap member 132 as urged downwardly toward block 144 by spring 137 is moved into gripping condition by the arc of motion of member 132 around pin 128. The guide rail 120 limits the downward movement of member 132 and prevents an excessive downward gripping action of member 132 on tube 50. At the determined forward extent of the feeding stroke of the cylinder 80 the tubing 50 has been advanced the determined amount into the cut off and transfer mechanism, above-described.

The fixed tube gripping arrangement provided by the fixed block 124 and cap member 132 now comes into action to insure that the just-advanced tubing 50 is not drawn backwardly by the return stroke movement of slide block 140. Any reverse movement of tubing 110 causes the cap member 132 above block 124 to swing downwardly to grip the tubing as the block 140 is moved toward cylinder 80. This return movement of the block 140 causes the engagement of cap member 132 to swing outwardly and upwardly against the action of spring 137, and releases the grip on the tubing by block 144 and the above cap member 132. On the succeeding feeding stroke of block 140 the cap member 132 carried above front fixed block 124 is swung outwardly and upwardly to release its check movement gripping condition of the tubing 50.

A tubing supply detection means is also indicated for the above apparatus. A detection device 170 is shown and includes a roller 172 adapted to engage the tubing passing to the grooved pulley 111 and as the tubing is supplied to the feeding mechanism the roller 172 is lifted by the tubing 50. The absence of tubing permits the roller to drop causing a switch 174 to be actuated. Preferably this switch actuation shuts off the bail-making mechanism.

The tubing cut off and transfer apparatus of FIGS. 1 through 4 is attached to the main plate 10 and the pneumatic cylinder 34 is connected into a timing sequence initiated by the bail-forming apparatus. The tubing advance mechanism 70 is attached to the side rail 20, as depicted in FIGS. 1 and 6, after which it is assumed that the wire bail-forming apparatus is to be placed in operation. Cylinder 34 is actuated in timed sequence with the wire forming operation to move forwardly and place a length of previously cut plastic tubing 50 into and in way of the advancing wire. During the period of forward transfer, the curved outer ends of upper and lower fingers 24 and 26 and the stops 54 and 56 retain this cut tubing 50. The uncut tubing 50 during this transfer is advanced by means of the cylinder 80 to provide the determined length of tubing desired for the particular grip length being mounted on the wire. As described in U.S. Pat. No. 3,675,305, this advanced tubing is held by the chuck 132 against return of the uncut tubing 50. After the wire has been passed through the tube length in cutout 74, the cylinder 34 is actuated to return the tubing transfer to the tubing receiving position of FIG. 4. The knife 64, during this return stroke, cuts the tube at this determined length. As the ends of the fingers are brought in way of this cut tube length, the supported portion of the transfer fingers 24 and 26 open to retain the tube by the curved ends and ribs 54 and 56. The forward stroke can now be initiated. After the bail has been mounted, cylinder 34 is actuated by means of a pneumatic signal initiated by the bail-forming mechanism and forward transfer of the cut tubing length is achieved to bring this spring-gripped tubing in way of the incoming wire length as it is advanced between the upper and lower dies of the wire bail forming apparatus. In all respects the tubing cut off and transfer apparatus operates to provide the same cut off and transfer of a cut length of tubing as in the apparatus of U.S. Pat. No. 3,675,305 except that instead of a mechanical transfer which depends upon linkage actuation provided by the bail-forming apparatus the present apparatus employs a pneumatic transfer which is much more responsive to higher operating speeds. The tube 50 has much more time for advance into this cut off and transport mechanism while the cut tube is positioned in way of the wire. The wire bail-forming apparatus is thus able to be operated at speeds greater than those in the apparatus described in my U.S. Pat. No. 3,675,305 as issued July 11, 1972.

The employment of pneumatic actuations enables field adjustments and/or changes to be easily made. The adjustments may provide for tubing length changes and/or timing as to the positioning and advance and transport.

The apparatus for applying plastic tubing grips to wire bail handles prior to their forming for mounting on containers provides novel method steps of cutting and transporting the tubing. The bail-forming mechanism with which this tubing cutting and transporting method is used is adapted to receive, feed cut and form wire so as to provide a wire bail for attachment to an eared container. The associated plastic grip applying apparatus includes a plastic tubing receiving and advancing mechanism having a check mechanism disposed to engage the tubing so as to permit only a forward passage of the tubing and a movable gripping mechanism disposed to grip the tubing when moved in an advancing motion from a delivery start to a delivery completed position and to slide on the tubing when moved from the delivery completed to the delivery start position. The new method steps provided by improved apparatus for the cutting and transfer of said advanced tubing include the steps of: a pair of guide rails secured to and carried by the wire bail-forming mechanism; upper and lower finger members supported and carried by said uide rails and reciprocably movable with respect thereto, said fingers spaced so that an advancing tubing may be fed therebetween, said fingers further having at least one of the forward end portions bent at its distal portion toward the other to provide gripping means for releasably retaining a transversely disposed cut length of tubing, at least one of said forward ends having an adjacent length sufficiently unrestrained so that it may be deflected slightly away from the other to release the cut length of tubing, this end portion having sufficient residual bias to permit deflection thereof after which the bias causes it to return to a tubing retaining condition; means for simultaneously moving the fingers from a rear, tubing receiving position to a forward position whereat the interior passageway of the cut tubing is brought substantially into coincidence with the path of an advancing wire of the bail-forming mechanism, the advancing wire passing through the tubing to retain the tubing on this wire as the finger members are moved from the bail-applying mechanism, the tubing now mounted on the wire is detached from the finger members which absent the forwardly transported cut tubing are now moved to their rear, tubing receiving position, and means for cutting the advanced tubing to a determined length at a period in the cycle sequence which is at least prior to the advancement of the fingers forwardly with a cut length of tubing.

Those terms such as "left", "right", "up", "down", "bottom", "top", "front", "back", "in", "out" and the like are applicable to the embodiment shown and described above.

While this particular embodiment of the tubing cut off and transport mechanism has been shown and described it is to be understood the invention is not limited thereto since modifications may be made within the scope of the accompanying claims and protection is sought to the broadest extent the prior art allows.

What is claimed is:

1. In an apparatus for applying plastic tubing grips to wire bail handles prior to their forming for mounting on containers, this bail forming mechanism adapted to receive, feed, cut and form wire so as to provide a wire bail for attachment to an eared container; an associated plastic grip applying apparatus including a plastic tubing receiving and advancing mechanism having a check mechanism disposed to engage the tubing so as to permit only a forward passage of the tubing and a movable gripping mechanism disposed to grip the tubing when moved in an advancing motion from a delivery start to a delivery completed position and to slide on the tubing when moved from the delivery completed to the delivery start position and in conjunction therewith an improved apparatus for the cutting and transfer of said advanced tubing including: (a) a pair of guide rails secured to and carried by the wire bail-forming mechanism; (b) upper and lower finger members supported and carried by said guide rails and reciprocably movable with respect thereto, said fingers spaced so that an advancing tubing may be fed therebetween, said fingers further having at least one of the forward end portions bent at its distal portion toward the other to provide gripping means for releasably retaining a transversely disposed cut length of tubing, at least one of said forward ends having an adjacent length sufficiently unrestrained so that it may be deflected slightly away from the other to release the cut length of tubing, this end portion having sufficient residual bias to permit deflection thereof after which the bias causes it to return to a tubing retaining condition; (c) means for simultaneously moving the fingers from a rear, tubing receiving position to a forward position whereat the interior passageway of the cut tubing is brought substantially into coincidence with the path of an advancing wire of the bail-forming mechanism, the advancing wire passing through the tubing to retain the tubing on this wire as the finger members are moved from the bail-applying mechanism, the tubing now mounted on the wire is detached from the finger members which absent the forwardly transported cut tubing are now moved to their rear, tubing receiving position, and (d) means for cutting the advanced tubing to a determined length at a period in the cycle sequence which is at least prior to the advancement of the fingers forwardly with a cut length of tubing.

2. A tubing cutting and transfer apparatus as in claim 1 in which the guide rails are side rails arranged parallel to each other and at one end are secured to a main plate of the bail-forming apparatus and in which the advancing tubing is fed into the space between said rails and through a guide aperture means in and through the side of one rail.

3. A tubing cutting and transfer apparatus as in claim 2 in which the upper and lower finger members have those ends opposite the tube gripping ends secured to a spacer block which is operatively connected to a piston rod of a pneumatic cylinder, which cylinder is actuated in response to the advancing and bending of a length of wire in the bail-forming mechanism.

4. A tubing cutting and transfer apparatus as in claim 3 in which the finger members are provided with guide means which cooperatively engage guide retaining means provided by the side rails, said guide means and guide retaining means enabling the upper and lower fingers to extend forwardly from their mounting to said spacer block in a parallel and unconnected manner for a distance which is greater than the length of the reciprocation movement of the finger members as they are moved to transport the cut tubing from its received position to its position in way of the advancing wire.

5. A tubing cutting and transfer apparatus as in claim 4 in which the guide means on the finger members are sidewardly extending longitudinal portions of the finger members, these sidewardly extending portions slidably retained in parallel grooves formed in the inner faces of the side rails to provide the guide retaining means.

6. A tubing cutting and transfer apparatus as in claim 5 in which the guide aperture means in the side rail is substantially midway between the parallel grooves formed in that rail.

7. A tubing cutting and transfer apparatus as in claim 4 in which a tubing support block is secured to and between the side rails, the face of this tubing support block which is disposed toward the main plate of the bail-applying mechanism being substantially parallel to the main plate, this face portion curved and aligned to support the side of the advancing and advanced tubing.

8. A tubing cutting and transfer apparatus as in claim 7 in which a tubing cutting blade is carried by at least one of the finger members, the cutting edge of the blade disposed away from the main plate of the bail-applying mechanism and to cut the advanced length of tubing adjacent the side rail through which it is fed, the cutting occurring as the finger members are moved from the bail-applying mechanism to the tubing receiving position, the advanced length of tubing being supported by the curved face as the cutting edge of the blade is moved thereto and into a relief formed in said face.

9. A tubing cutting and transfer apparatus as in claim 8 in which the tubing engaging ends of the upper and lower fingers are each curved toward the other and inwardly a short distance from these curved ends and on their facing inner surfaces there is provided on each finger a tubing stop shoulder to provide additional means for retaining the cut tube and particularly as the finger members are moved forwardly.

10. A tubing cutting and transfer apparatus as in claim 9 in which the plastic tubing receiving and advancing mechanism is secured to and is carried by the side rail through which the tubing is fed and in the other side rail an aperture access means is provided to permit tubing to be withdrawn sideways from the finger members.

11. In a method for applying plastic tubing grips to wire bail handles prior to their forming for mounting on containers, this bail-forming mechanism adapted to receive, feed, cut and form wire so as to provide a wire bail for attachment to an eared container; an associated plastic grip applying apparatus including a plastic tubing receiving and advancing mechanism having a check mechanism disposed to engage the tubing so as to permit only a forward passage of the tubing and a movable gripping mechanism disposed to grip the tubing when moved in an advancing motion from a delivery start to a delivery completed position and to slide on the tubing when moved from the delivery completed to the delivery start position and in conjunction therewith an improved method for the cutting and transfer of said advanced tubing including the steps of: (a) mounting a pair of guide rails to the wire bail-forming mechanism and substantially normal to the main plate thereof; (b) providing a pair of upper and lower finger members and means for the reciprocal movement within said guide rails by these finger members and spacing said fingers so that an advancing tubing may be fed therebetween; (c) bending the distal portion of at least one of the forward end portions of the finger members toward the other to provide gripping means for releasably retaining therebetween a transversely disposed cut length of tubing and forming at least one of said forward ends and an adjacent length so as to be sufficiently unrestrained whereby it may be deflected slightly away from the other to enable releasing the cut length of tubing, this end portion having a sufficient residual bias to permit this deflection during the releasing of the tubing after which said bias causes a returning of the finger members to a tubing retaining condition; (d) simultaneously moving the fingers from a rear, tubing receiving position to a forward position therewith positioning the interior passageway of the cut tubing substantially in the path of an advancing wire of the bail-forming mechanism, the advancing wire passing through the tubing to retain the tubing on this wire; (e) removing the finger members from the cut tube by moving the finger members from the bail-applying mechanism, the tubing now mounted on the wire is detached from the finger members which absent the forwardly transported cut tubing are now moved to the rear, tubing receiving position, and (f) cutting the advanced tubing to a determined length at a period in the cycle sequence which is at least prior to the advancement of the finger members forwardly with another cut length of tubing.

12. The method of applying plastic tubing grips to wire bail handles as in claim 11 which includes the further step of reciprocably moving the finger members by a pneumatic cylinder and actuating this cylinder in repsonse to the advancement of a wire into the bail-forming mechanism.

13. The method of applying plastic tubing grips to wire bail handles as in claim 12 which includes the further step of forming the finger members with longitudinal side portions and in the guide rails forming parallel slots in which the longitudinal sides of the finger members are carried and slide and mounting the ends of the finger members which are opposite the tube gripping ends to a spacer block with the forwardly extending portion of the finger members free of the spacer block being an extent which is greater than the length of reciprocation movement of the finger members.

14. The method of applying plastic tubing grips to wire bail handles as in claim 13 which includes the further step of achieving the cut off of the advanced tubing by mounting a tubing support block between the side guides and between the forwardly extended portions of the finger members and forming on the face of this block toward the bail-forming mechanism a curved surface sized and aligned to support and guide the advancing tubing to a supported condition for the cutting of the tubing.

15. The method of applying plastic tubing grips to wire bail handles as in claim 14 which includes the further step of providing a tubing guide bushing in a side guide and positioning said bushing so that the tubing is fed between the upper and lower finger members and fixedly securing on at least one of said finger members a cutting blade so as to be movable therewith and positioning the blade so that its cutting edge is directed away from the tubing gripping ends of the finger members.

16. The method of applying plastic tubing grips to wire bail handles as in claim 15 which includes the further step of curving in a like manner toward each other the bent ends of the finger members and securing on each of their facing inner surfaces and at a selected distance from the associated curved end of the finger members a tubing stop shoulder disposed to engage and retain the cut tube between these shoulders and the curved ends and the further step of mounting the cutting blade a distance which is further from the curved end of the finger members than the distance of the tubing stop shoulders from the curved ends.

* * * * *